United States Patent
Myers

[15] 3,690,693
[45] Sept. 12, 1972

[54] TORSION BAR STABILIZING APPARATUS FOR VEHICLES

[72] Inventor: Lester L. Myers, Fort Wayne, Ind.

[73] Assignee: Mobile Aerial Towers, Fort Wayne, Ind.

[22] Filed: May 11, 1970

[21] Appl. No.: 36,048

[52] U.S. Cl..................................280/24 R, 267/57
[51] Int. Cl................................................B60g 11/46
[58] Field of Search..........280/124 R, 124 A; 267/57

[56] References Cited

UNITED STATES PATENTS 3,003,782    10/1961    Hickman..............280/124 A

*Primary Examiner*—Phlip Goodman
*Attorney*—Hood, Gust, Irish & Lundy

[57] ABSTRACT

Torsion bar stabilizing apparatus for a Vehicle which includes a frame, a transversely extending axle, and transversely spaced-apart springs respectively connecting the axle to the frame. An elongated, rigid, transversely extending bar has a pair of lever members rigidly secured to its opposite ends, the lever members being pivotally connected to the axle. A pair of variable length, hydraulically lockable and releasable link elements each have one end connected to the frame and the other end pivotally connected to a respective lever member. Application of hydraulic pressure to the link elements adjusts and locks the lengths thereof to a predetermined length thereby providing a rigid, fixed-length pivotal support for the lever members and bar so that the springs are substantially equally deflected and transverse tilting of the frame with respect to the axle is inhibited. Release of the hydraulic pressure permits unrestricted variation in the length of the link elements and thus unequal deflection of the springs.

14 Claims, 11 Drawing Figures

Patented Sept. 12, 1972
3,690,693
4 Sheets-Sheet 1
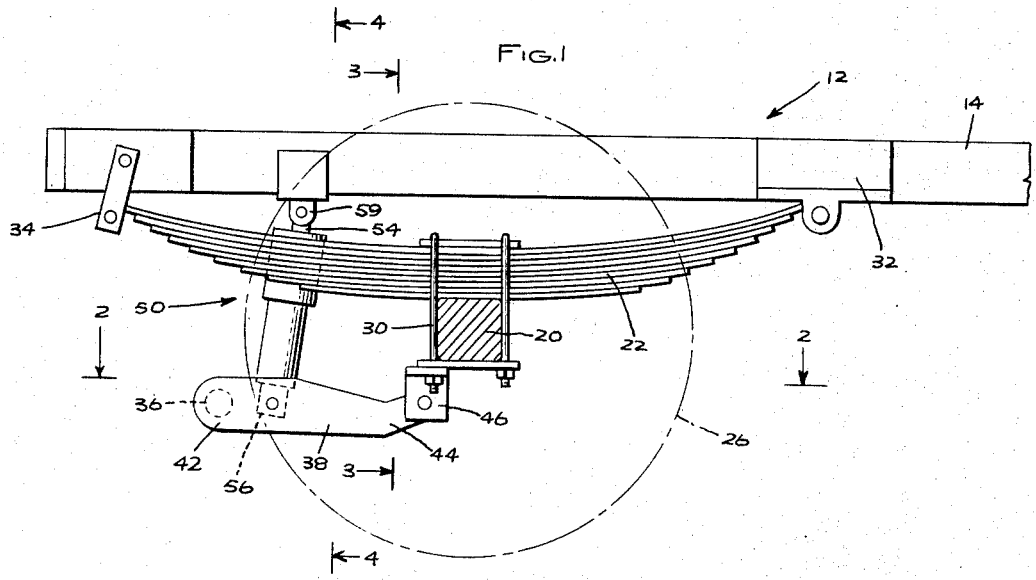
FIG.1
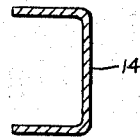
FIG.3
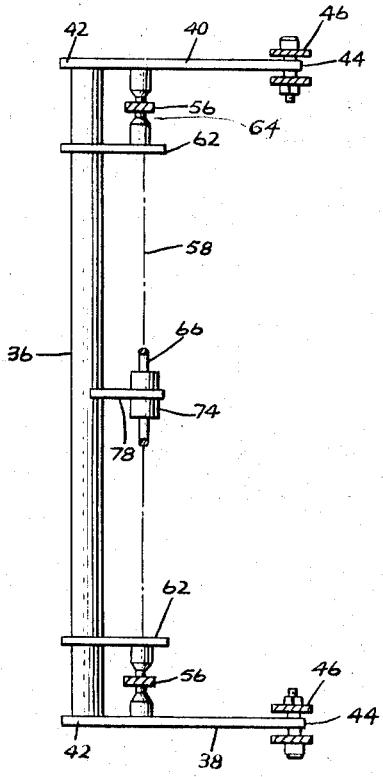
FIG.2
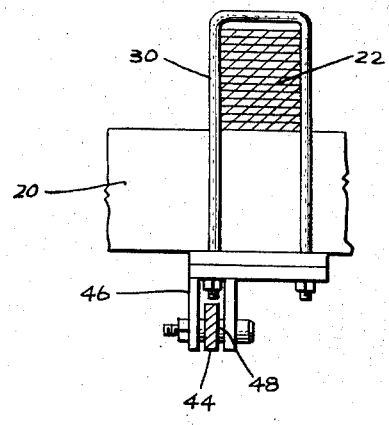
INVENTOR:
LESTER L. MYERS,
By Hood, Gust, Irish & Lundy
ATTORNEYS.

Patented Sept. 12, 1972

INVENTOR:
LESTER L. MYERS,
By Hood, Just, Drake & Sundry
ATTORNEYS.

Patented Sept. 12, 1972

INVENTOR:
LESTER L. MYERS,
BY Hood, Gust, Irish & Lundy
ATTORNEYS.

Patented Sept. 12, 1972

INVENTOR:
LESTER L. MYERS,
BY Hood, Gust, Irish & Lundy
ATTORNEYS.

TORSION BAR STABILIZING APPARATUS FOR VEHICLES

BACKGROUND OF THE INVENTION

1. Field of the Invention

This invention relates generally to torsion bar stabilizing apparatus for vehicles, and to a hydraulically lockable and releasable link element for use in such apparatus.

2. Description of the Prior Art

The left and right sides of a vehicle, such as a truck, are conventionally provided with individual springs, which may be leaf springs or air springs, connecting the rear axle or axles to the frame. If an off-center or overhung load is placed upon the truck, such as by extending the boom of an aerial platform or a derrick over the side of the truck, unequal loads are placed on the springs, thus causing the frame and body of the truck to tilt with respect to the axle.

In order to inhibit such tilting of the body, it has been common practice to employ a torsion bar stabilizer. Conventional torsion bar stabilizers comprise a rigid, transversely extending shaft spaced from the axle and pivotally supported in bearings mounted on fixed length brackets depending from the frame. Torque arms or levers are rigidly mounted on each end of the bar and are pivotally connected to the axle adjacent the left and right spring attachments. This system causes the springs to deflect equally thereby maintaining the truck frame and body in parallel relationship with the axle, even with the application of an overhung load. Conventional torsion bar stabilizing apparatus functions satisfactorily when the truck is standing still or travelling over a smooth highway. However, most irregularities in a highway surface over which the truck must travel do not contact both rear wheels simultaneously. As a consequence, contact of one wheel with a bump or hole in the road surface resulting in deflection of the respective spring causes the torsion bar to deflect the opposite spring by an equal amount. This action in effect doubles effective stiffness of the springs resulting in an extremely rough ride which often causes damage to the truck and/or the load thereon.

SUMMARY OF THE INVENTION

The present invention eliminates the above-described deficiency of conventional torsion bar stabilizing apparatus by disconnecting the torsion bar from the truck frame during road travel.

In its broader aspects, the invention provides torsion bar stabilizing apparatus for a vehicle having a longitudinally extending frame, an axle extending transversely of the frame, and transversely spaced-apart resilient elements respectively connected between the frame and the axle. The apparatus includes an elongated, rigid bar extended transversely of the frame spaced from the axle and having opposite ends. A pair of lever members is provided each having opposite ends, one end of each lever member being rigidly secured to the bar adjacent a respective end, and the other end of the lever member being pivotally connected to the axle. A pair of variable length link elements is provided each having opposite ends, each of the link elements having one end connected to the frame and its other end pivotally supporting a respective lever member. Each of the link elements includes means for selectively adjusting the element to a predetermined length and for locking the same at that length thereby to provide a rigid, fixed-length pivotal support for the lever members and bar so that the resilient elements are substantially equally deflected and transverse tilting of the frame with respect to the axle is inhibited. The locking means is selectively releasable thereby permitting unrestricted variation in the length of the link elements and unequal deflection of the resilient elements. The length of the link elements is preferably variable between shorter and longer extremities, the predetermined length being generally midway between the extremities.

In the preferred embodiment, each of the link elements comprises a hydraulic cylinder, one of the link element ends being connected to the cylinder. The cylinder has a pair of floating pistons therein respectively movable relatively between abutting positions and extreme, spaced positions. The cylinder has a port therein for admitting hydraulic fluid under pressure between the pistons thereby to force the same to their spaced positions. A member is provided having means for respectively engaging the remote sides of the pistons when the pistons are in their spaced positions whereby the member is mechanically locked in a neutral position upon the application of hydraulic pressure. The other of the link element ends is connected to the member, and the member in its neutral position establishes the predetermined length of the link. Extension of the member with respect to the cylinder upon release of the hydraulic pressure causes one of the engaging means to move its respective piston from its extreme position toward the other piston, and retraction of the member with respect to the cylinder causes the other of the engaging means to move its respective piston toward the other piston. Abutment of the pistons at the extreme position of one of the pistons establishes one of the extremities, and abutment of the pistons at the extreme position of the other piston establishes the other extremity.

It is accordingly an object of the invention to provide an improved torsion bar stabilizing apparatus for a vehicle.

Another object of the invention is to provide an improved torsion bar stabilizing apparatus for a vehicle wherein the apparatus may selectively be disconnected from the vehicle frame for road travel.

A further object of the invention is to provide an improved torsion bar stabilizing apparatus for a vehicle employing a hydraulically lockable and releasable mechanism for selectively connecting a torsion bar to the vehicle frame, and selectively disconnecting the same therefrom.

Still another object of the invention is to provide an improved variable length link element which may be selectively hydraulically locked at a predetermined length, and selectively released to permit unrestricted variation in its length.

The above-mentioned and other features and objects of this invention and the manner of attaining them will become fore apparent and the invention itself will be best understood by reference to the following description of an embodiment of the invention taken in conjunction with the accompanying drawings, wherein:

BRIEF DESCRIPTION OF THE DRAWINGS

FIG. 1 is a fragmentary side view, partly in cross section, of the rear end of a vehicle incorporating the improved torsion bar stabilizing apparatus of the invention;

FIG. 2 is a sectional view taken generally along the line 2—2 of FIG. 1;

FIG. 3 is a fragmentary sectional view taken generally along the line 3—3 of FIG. 1;

DESCRIPTION OF THE PREFERRED EMBODIMENT

Figure 10:
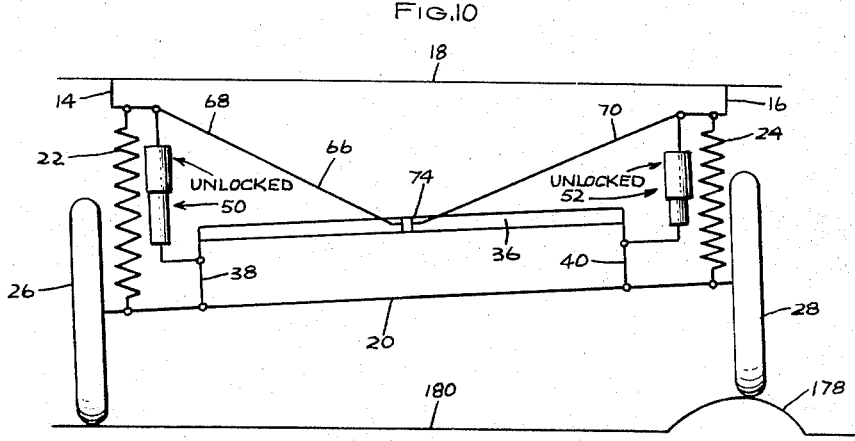
FIG. 10 is a schematic end view of the apparatus of the invention showing the action of the apparatus of the invention with the link elements unlocked.

Referring now to the figures of the drawing, the rear end of a vehicle, such as a truck for supporting an aerial platform, is shown at 12. Conventional transversely spaced-apart, longitudinally extending, side frame members 14, 16 are provided which support a conventional truck bed 18 (FIG. 10). A conventional transversely extending axle 20 supports frame members 14, 16 through conventional leaf springs 22, 24. Each end of axle 20 is supported by one or more wheels 26, 28.

Leaf springs 22, 24 are attached to axle 20 adjacent its respective ends by a conventional U-bolt bracket assembly 30. The forward end of each spring 22, 24 is secured to the respective frame member 14, 16 by a conventional bracket 32, and the rear end is connected to the respective frame member by a conventional shackle 34. It will be readily understood that the particular spring system shown does not alone form the present invention, and that other conventional springs, such as coil springs or air springs may be substituted for the leaf springs 22, 24.

A torsion bar in the form of a rigid rod 36 extends transversely at the truck below frame members 14, 16 and is spaced rearwardly from axle 20. A pair of lever members 38, 40 have the rear ends 42 thereof rigidly secured to the respective outer ends of torsion bar 36, as by welding, and the forward ends 44 thereof are respectively pivotally connected to bracket members 46 attached to the spring bracket assemblies 30 by means of suitable self-aligning bearings 48, which may be of the same type employed in pivotally connecting links 50, 52 to frame members 14, 16, as will be hereinafter more fully described in conjunction with FIG. 6 of the drawings.

In accordance with the invention, elongated link elements 50, 52 have the upper ends 54 thereof pivotally connected to frame members 14, 16 and the lower ends 56 pivotally connected to lever members 38, 40 for pivotal movement about axis 58 (FIG. 2) spaced forwardly from bar 36. As will be hereinafter more fully described, link elements 50, 52 are variable in length and may selectively be locked at a predetermined length generally midway between the extremes of such variation. When so locked, link elements 50 provide a rigid, fixed-length pivotal support for lever members 38, 40 and torsion bar 36 so that springs 22, 24 are substantially equally deflected and transverse tilting of frame members 14, 16 and body 18 with respect to axle 20 is inhibited. When the locking of link elements 50, 52 is released, unrestricted variation of the length of each link element 50, 52 is permitted, thus permitting unequal deflection of springs 22, 24.

Upper ends 54 of links 50, 52 are pivotally connected to brackets 59 by means of suitable self-aligning bearings 60 (FIG. 4) to be more fully described hereinafter in conjunction with FIG. 6. Brackets 59 are secured to the respective frame members 14, 16, as by welding. Lower ends 56 of link elements 50, 52 are pivotally connected to lever members 38, 40 at points intermediate their ends 40, 42 which lie on axis 58 (FIG. 2), and to bracket members 62 secured to bar 36 by means of suitable self-aligning bearings 64 also to be more fully described hereinafter in conjunction with FIG. 6.

Figure 4:
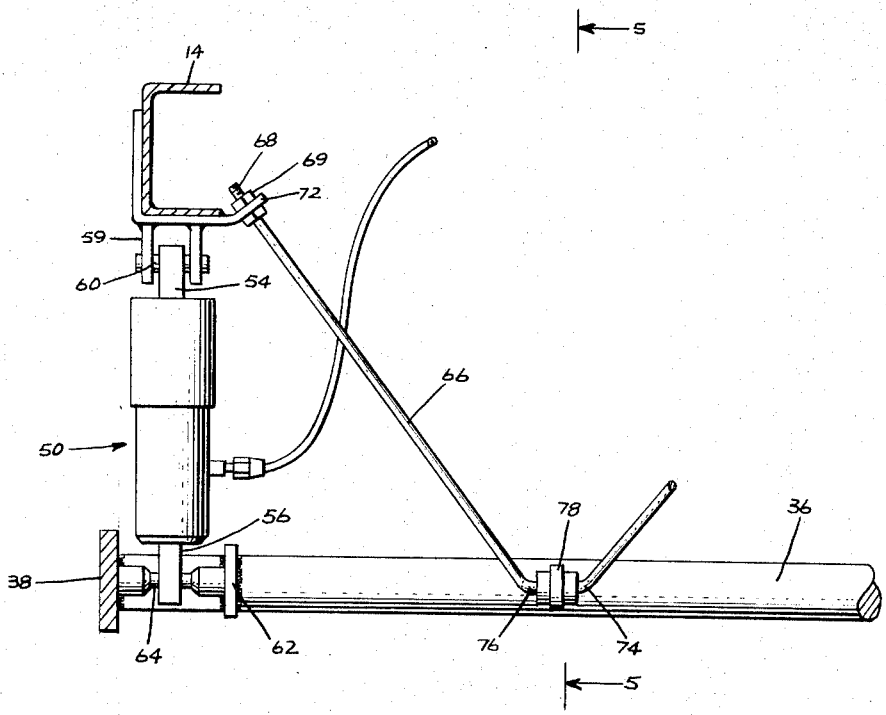
FIG. 4 is a fragmentary sectional view taken generally along the line 4—4 of FIG. 1.
Figure 5:
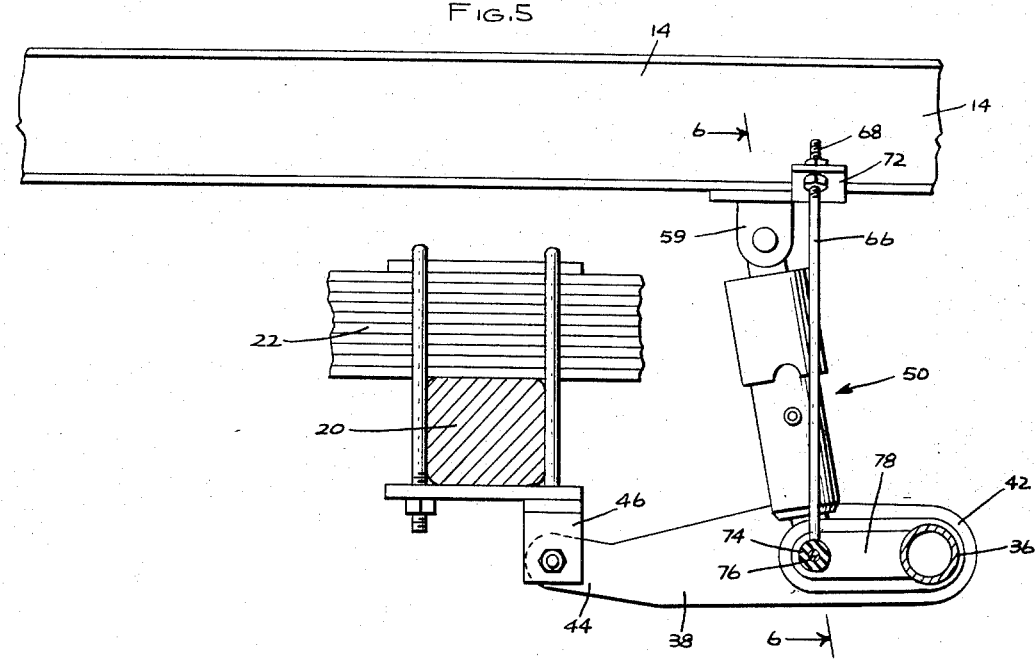
FIG. 5 is a fragmentary sectional view taken generally along the line 5—5 of FIG. 4.

Torsion bar 36 is further suspended for swinging about axis 58 and also for tilting movement about axis 170 (FIG. 8) with respect to frame members 14, 16 and body 18 by means of a generally V-shaped brace rod 66 having its opposite ends 68, 70 adjustably secured to extension portions 72' of brackets 58 as by nuts 69. Portion 74 of brace rod 66 is mounted in bearing bushing 76 formed of suitable resilient material, such as rubber, which, in turn, is mounted in bracket 78 secured to and extending forwardly from a point on torsion bar 36 midway between its opposite ends (FIG. 4). Brace rod 66 is adjusted to support the midpoint of torsion bar 36 below the frame members 14, 16 at a distance equal to the spacing of the opposite ends of the bar from the frame members when the link elements 50, 52 are locked.

Figure 6:
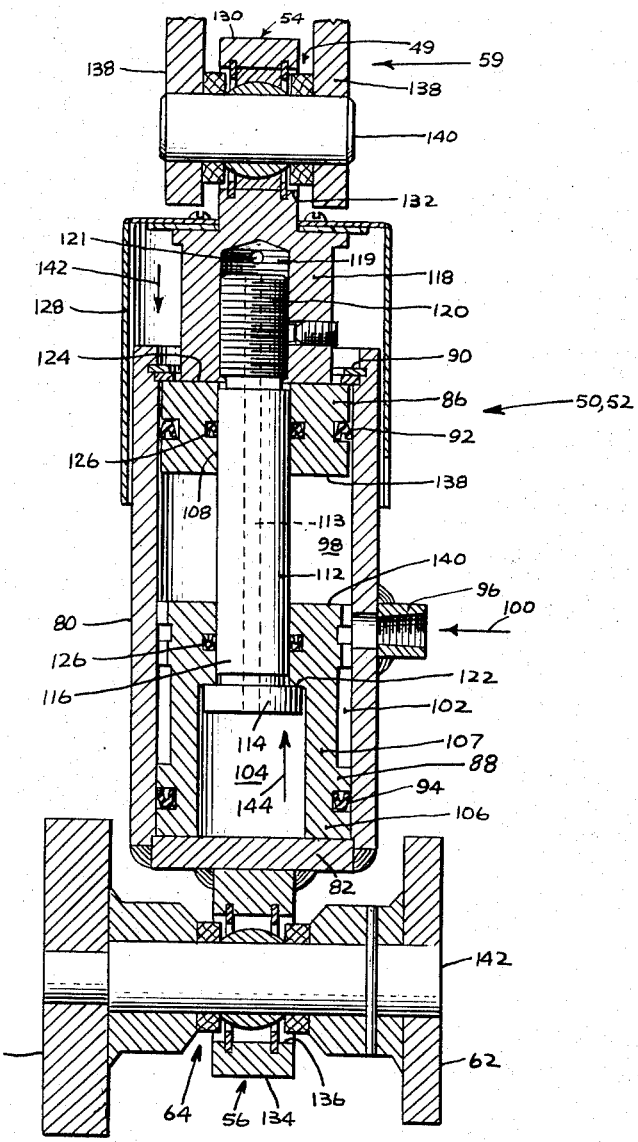
FIG. 6 is a longitudinal section of one of the link elements of the invention taken generally along the line 6—6 of FIG. 5.

Referring now particularly to FIG. 6, each of the link elements 50, 52 comprises a hydraulic cylinder 80 having a closed lower end 82 and an open upper end 84. Cylinder 80 has upper and lower floating pistons 86, 88 therein respectively movable relatively between upper and lower extreme spaced positions, as shown, and abutting positions. Snap ring 90 seated in an annular groove in the wall of cylinder 80 adjacent to open end 84 establishes the extreme upper position of piston 86, and closed end 82 of cylinder 80 establishes the extreme lower position of piston 88. Suitable seals 92, 94 seated in annular grooves in the peripheral surfaces of pistons 86, 88 sealingly engage the inner wall of cylinder 80 to prevent leakage of hydraulic fluid past the respective pistons.

Cylinder 80 has a port 96 in its side wall for admitting hydraulic fluid under pressure to a chamber 98 between pistons 86, 88, as shown by the arrow 100, thereby to force pistons 86, 88 respectively outwardly to their extreme upper and lower positions, into operative abutment with ring 90 and end 82 of cylinder 80, respectively, as shown. Piston 88 is elongated for a purpose shortly to be described and has suitable grooves 102 formed in its peripheral surface communicating between port 96 and chamber 98 for admitting hydraulic fluid thereto despite upward movement of piston 88 toward piston 86.

Piston 88 has a coaxial recess 104 formed in its bottom portion 107. Pistons 86 and 88 have central bores 108 and 110, respectively, bore 110 communicating with recess 104. A rod 112 slidably extends through bores 108, 110 and has an enlarged head portion 114 on its lower end 116. An enlarged solid member 118 is threadingly secured to the upper end 120 of rod 112. When hydraulic pressure is applied to port 96 thus forcing pistons 86, 88 to their upper and lower extremities, head 114 on the lower end of rod 112 abuts the annular radial shoulder 122 of recess 104 and member 118 abuts the upper surface 124 of piston 86, thus firmly locking rod 112 and member 118 in a neutral position relative to cylinder 80. Suitable seals 126, 128 are seated in annular grooves formed in bores 108, 110 of pistons 86, 88 and sealingly engage rod 112 thereby to prevent leakage of hydraulic fluid. A cup-shaped cap 128 is secured to member 118 and surrounds the upper end of cylinder 80 to prevent the entrance of dirt and water into the open upper end 84 of the cylinder. Upper end 54 of link elements 50, 52 comprises a portion 130 integrally formed on and extending upwardly from member 118, and having a transverse opening 132 formed therein. Lower end 56 comprises a portion 134 integral therewith extending downwardly from bottom end 82 of cylinder 80 and having a transverse opening 136.

Rod 112 has a coaxial bore 113 therein communicating between recess 104 in piston 88 and bore 119 in member 118 into which end 120 of rod 112 is threaded. Hole 121 in member 118 communicates with bores 119 and 113. Hole 121 and bore 113 admit air to recess 104, and under piston 88 when it is moved away from closed end 82 of cylinder 80, thus relieving the vacuum which otherwise would be caused by upward movement of piston 88.

Brackets 59 comprise transversely spaced, parallel arms 138 having portion 130 disposed therebetween. Arms 138 are pivotally coupled to portion 130 by pivot pin 140 with self-aligning bearing 48 supporting pin 140 in opening 132. Portion 134 is pivotally connected to arms 38, 40 and brackets 62 by pivot pin 142, self-aligning bearings 64 supporting pin 142 in opening 136.

It will now be seen that when the hydraulic pressure is released from the cylinder port 96, any force in either direction applied between ends 54, 56 caused by unequalled deflection of the springs 22, 24 will cause relative movement of one piston toward the other, thus forcing fluid out of chamber 98 through port 96 until the facing surfaces 138, 140 of pistons 86, 88 are in abutting relationship. With all of the fluid exhausted from between pistons 86, 88, rod 112 is free to move in either direction from its neutral position, as shown in FIG. 6, until the pistons are in abutting relationship with one piston or the other at its extreme end, i.e., with piston 86 in engagement with snap ring 96 or piston 88 in engagement with closed end 82 of cylinder 80. Thus, it will be seen that downward movement of end 54, member 118 and rod 112, as shown by arrow 142, away from the neutral position of rod 112 as shown in FIG. 6, will result in piston 86 being moved downwardly until its lower surface 138 is in abutting relationship with the upper surface 140 of piston 88, recess 104 accommodating the downward movement of rod 112 through opening 110 in piston 88. Similarly, upward movement of end 54, member 118 and rod 112 away from its neutral position, as shown by arrow 114, will result in head portion 114 moving piston 88 upwardly until its upper surface 140 is in abutting relationship with bottom surface 138 of piston 86.

It will now be seen that the shortest length of link elements 50, 52 is obtained when rod 112 is retracted with respect to cylinder 80 in the direction shown by the arrow 142 until pistons 86, 88 are abutting with piston 88 abutting the closed end 82 of cylinder 80, and that the longest length of links 50, 52 is obtained upon extension of rod 112 with respect to cylinder 80 until pistons 86, 88 are abutting with piston 86 abutting snap ring 90. It will further be seen that upon release of the hydraulic pressure, rod 112 may be relatively retracted or extended by equal distances from the neutral, locked position of rod 112, as shown in FIG. 6, and thus that the locked length of links 50, 52 is substantially midway between their shortest and longest lengths.

Figure 7:
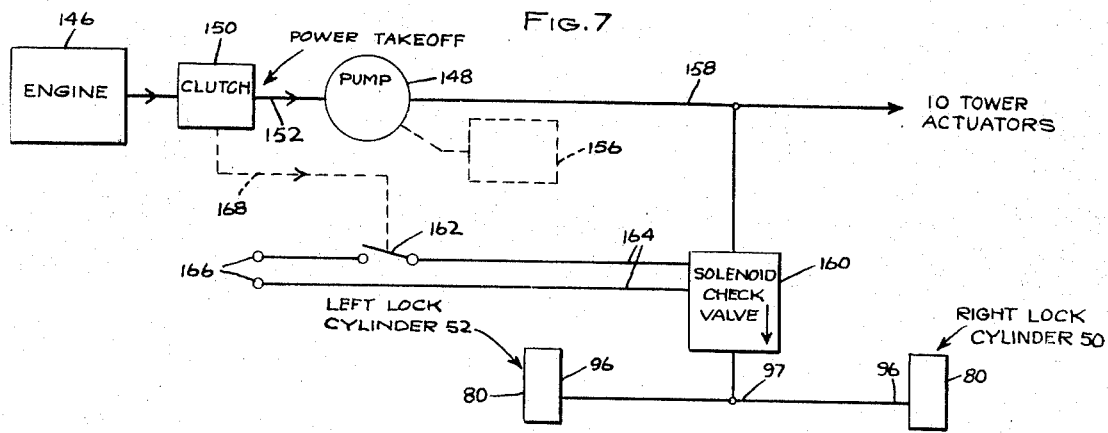
FIG. 7 is a schematic view of a hydraulic system which may be employed in conjunction with the apparatus of the previous figures.

Referring now to FIG. 7 the engine 146 of the vehicle may drive a suitable hydraulic pump 148 through a conventional electrically actuable power take-off clutch 150 and power take-off 152. Pump 148 supplies hydraulic fluid under pressure to pressure line 158 which, in turn, is coupled to other hydraulically operated apparatus mounted on the vehicle, such as an aerial tower.

A normally closed solenoid valve device 160 couples pressure line 158 to ports 96 of cylinders 80 of the left and right links 50, 52. When it is desired to lock links 50, 52 in their neutral positions, valve device 160 is closed by being de-energized, thus preventing the escape of fluid from cylinders 80. Valve device 160 is conventional and includes a one-way check valve (not shown), which is normally closed on its seat from which it may be unseated by high pressure from pressure line 158 to allow flow of fluid into cylinders 80. This initially forces pistons 86, 88 apart into engagement with abutments 82 and 90, moving rod 112 to its neutral, locked position (FIG. 6). Thereafter, so long as valve 160 is closed pressure will be maintained in cylinders 80, maintaining rod 112 in its neutral position and locked because pressure in line 97 acts to seat the check valve and keep it closed. When it is desired to release links 50, 52, valve device 160 is energized, which opens the valve and couples ports 96 of cylinders 80 to line 158, which at that time is at reduced pressure due to termination of the operation of pump 148, thus allowing the fluid in the cylinders to escape to the conventional reservoir 156.

Valve device 160 is selectively energized by a suitable switch 162 connected to a suitable source of electrical potential 166 by leads 164. In one arrangement, manually actuated clutch 150 is operatively connected to switch 162, as shown by the dashed line 168, so that actuation of clutch 150 to drive pump 148 so as to apply fluid pressure to line 158 will also open switch 162 thereby to de-energize valve device 160, and similarly, deactuation of clutch 150 thereby to terminate operation of pump 148 and to reduce the pressure in line 158 will close switch 162 so as to energize valve device 160. Thus, in the case of a truck mounting an aerial tower, actuation of the power take-off clutch 150 to provide hydraulic pressure in line 158 for operating the tower will automatically result in de-energization and closing of valve device 160, application of hydraulic pressure through the one-way check valve of valve device 160 to cylinders 80, and locking of links 50, 52. Likewise, deactuation of power take-off clutch 150 to terminate operation of pump 148 will result in reduction of pressure in line 158, and also in energization and opening of valve device 160 so that fluid which escapes from the cylinders 80 due to unequal deflection of springs 22, 24 will be returned to reservoir 156.

It will now be seen that link elements 50, 52 are initially driven to their predetermined lengths midway between their shorter and longer lengths, and locked at their predetermined lengths by de-energization of valve device 160 which, when de-energized, functions as a one-way check valve (not shown) to apply hydraulic pressure to cylinders 80, thereby to lock rods 112 in their neutral positions, while preventing reverse flow of fluid from the cylinders. Thus, de-energization of valve device 160 locks the torsion bar apparatus so as to provide equal spring deflection and inhibit tilting of the body of the vehicle with respect to the axle. It will be seen that since valve device 160 must be energized to unlock the torsion bar, any electrical failure leaves the torsion bar in its locked position, thus rendering it failsafe. Further, removal of fluid pressure from pressure line 158 for any reason, such as by stalling of the engine or a leak in the hydraulic system, will also leave the torsion bar in its locked position so long as switch 162 is open and the valve device 160 thus de-energized and closed.

Figure 8:
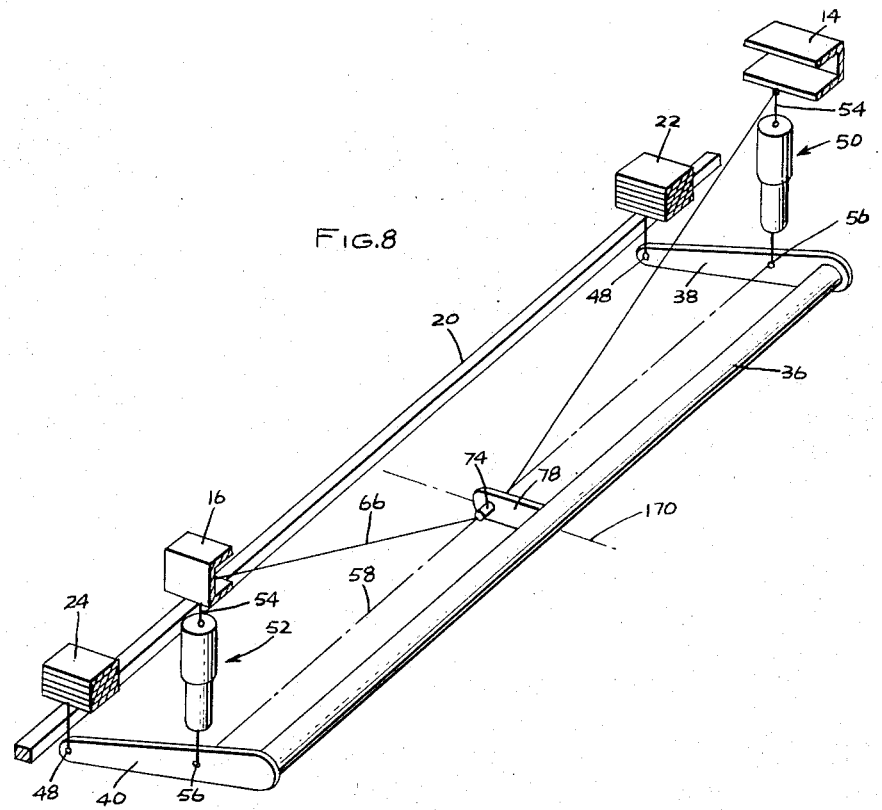
FIG. 8 is a simplified, fragmentary view in perspective further illustrating the improved torsion bar suspension apparatus of the invention.

Referring now to FIGS. 8, 9 and 10, it will be seen that brace rod 66 suspends torque bar 36 at a point intermediate its ends permitting its pivotal movement about axis 58 when link elements 50, 52 are locked and, through resilient sleeve bearing 74, permitting both pivotal movement and tilting movement with respect to body 18 when links 50, 52 are unlocked. Thus, brace rod 66 prevents torsion bar 36 from merely falling downwardly and consequently extending both link elements 50, 52 to their longest lengths when the link elements are unlocked. The self-aligning bearings which form a part of the pivotal connections of front ends 44 of lever members 38, 40 to brackets 46, and the pivotal connections of upper and lower ends 54, 56 of link elements 50, 52 to brackets 58 and lever members 38, 40, respectively, permit the torsion bar to pivot both about transverse axis 58 and longitudinal axis 170, thereby allowing free spring action when link elements 50, 52 are unlocked.

Figure 9A:
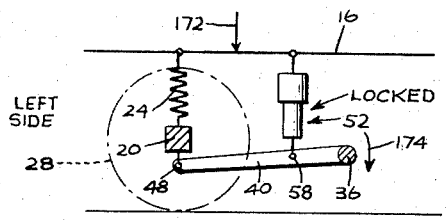
FIGS. 9A and 9B are fragmentary side views schematically illustrating the operation of the torsion bar apparatus of the invention with the link elements locked.
Figure 9B:
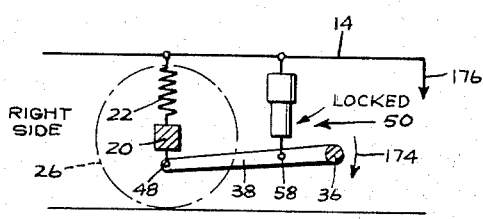

Referring now specifically to FIGS. 9A and 9B, it will be seen that with both link elements 50, 52 locked, a rigid, fixed length link is provided pivotally supporting lever members 38, 40 and torsion bar 36 for pivotal movement about axis 58. Thus, if an off-center load is applied to the left side of the body, as shown by the arrow 172 in FIG. 9A, which tends to compress spring 24, the downward movement of frame member 16 will cause lever 40 to pivot about connection 48 of the lever 40 to axle 20, as shown by arrow 174. Since line 50 has the same, fixed length as link 52, the downward pivotal movement of torsion bar 36 results in equal downward pivotal movement of lever member 38 about its connection 48 to axle 20, with the fixed length link 50 thus pulling the right frame member 14 and the right side of the body downwardly, as shown by the arrow 176 in FIG. 9B, thus compressing spring 22 by an equal amount.

Referring now specifically to FIG. 10, a condition is shown wherein the left wheel 28 has encountered a bump 178 on the road surface 180, thus tilting axle 20 with respect to the road surface. It will be readily understood that if the link elements 50, 52 had been locked, equal deflection of springs 22, 24 would occur with body 18 remaining parallel with axle 20 and thus tilted with respect to road surface 180. However, with link elements 50, 52 unlocked, unequal deflection of springs 22, 24 is permitted so that body 18 will be inclined with respect to axle 20 and torsion bar 36, the pivotal connection of brace rod 66 with the midpoint of torsion bar 36 by means of the resilient bearing sleeve 74 accommodating this tilting of body 18 with respect to torsion bar 36 and axle 20. It will be observed that springs 22, 24 are unequally deflected, and that by reason of this unequal deflection, link element 50 has been extended, while link element 52 has been compressed.

Efforts have been made in the past to inhibit tilting of the truck body by the employment of a pair of conventional hydraulic cylinders respectively connected between the opposite ends of the axle and the side frame members, the pistons of the cylinders being locked by closing off the cylinder ports. The apparatus of the present invention possesses a number of advantages thereover. With the apparatus of the invention, the truck body is forced into a position parallel with the ground (assuming the axle 20 is parallel to the ground) and maintained in that position, whereas with conventional hydraulic cylinders, any initial tilt of the truck due for example to uneven loading, unequal springs, or sloping terrain, will be retained when the cylinders are locked. Further, elasticity of the hydraulic fluid together with any air bubbles in the fluid will permit a conventional cylinder to compress under heavy loads, whereas the hydraulic link elements of this invention are completely rigid under load. Still further, leakage past the packings in a conventional cylinder will accumulate, also permitting compression In this invention, the hydraulic pressure is renewed each time hydraulic pump 148 is operated to actuate the aerial tower (not shown), thus rendering The effect of leakage much less critical.

While there have been described above the principles of this invention in connection with specific apparatus, it is to be clearly understood that this description is made only by way of example and not as a limitation to the scope of the invention.

What is claimed is:

1. Torsion bar stabilizing apparatus for a vehicle having a longitudinally extending frame, an axle extending transversely of same frame, and transversely spaced apart resilient elements respectively connected between said frame and said axle; said apparatus comprising an elongated, rigid bar extending transversely of said frame spaced from said axle and having opposite ends, a pair of lever members each having opposite ends, said lever members having one end rigidly connected to said bar adjacent to the ends thereof, respectively, means for pivotally connecting the other end of each of said lever members with respect to said axle, and a pair of variable length link elements each having opposite ends, each of said link elements having one end connected to said frame and the other end connected to said lever members, respectively, means including each of said link elements for selectively adjusting the latter to a pre-determined length and locking the same at said length thereby to provide a rigid, fixed-length support for said lever members and bar whereby said resilient elements are substantially equally deflected and transverse tilting of said frame with respect to said axle is inhibited, said link elements when unlocked permitting unequal deflection of said resilient elements.

2. The apparatus of claim 1 further comprising means for suspending said bar at a point intermediate its ends from said frame, said suspending means including means for mounting said bar for longitudinal swinging movement and for transverse tilting movement with respect to said frame.

3. The apparatus of claim 1 wherein each of said link elements is pivotally connected to a respective lever member at a point intermediate its ends whereby said bar is supported for swinging movement about the axis of said points.

4. The apparatus of claim 3 further comprising a member connected to said frame and depending therefrom, bearing means mounted on said bar at a point intermediate its ends for supporting said bar on said member for said swinging movement about said axis and for transverse tilting movement with respect to said frame, said member spacing said intermediate point on said bar from said frame a distance generally equal to the spacing of the ends of said bar from said frame when said link elements are locked.

5. The apparatus of claim 1 wherein each of said link elements comprises a hydraulic cylinder including an extensible element, and means for mechanically locking said extensible element at a position to establish said predetermined length in response to the application of hydraulic pressure to said cylinder.

6. The apparatus of claim 5 further comprising a hydraulic system including a source of hydraulic fluid under pressure, and a valve device coupling said source to said cylinders, said valve device being selectively actuable between first and second positions, said valve device including a one-way check valve, said check valve and valve device in said first position applying fluid under pressure to said cylinders while preventing reverse flow of fluid from said cylinders, said valve device in said second position thereof permitting escape of fluid from said cylinders.

7. The apparatus of claim 6 wherein said system comprises a pump, a reservoir and means for selectively actuating said pump, said valve device being electrically actuable between said positions thereof, said valve device being in said first position when deenergized and in said second position when energized, said valve device in said second position permitting return flow of fluid from said cylinder to said reservoir when said pump is not operating.

8. The apparatus of claim 1 wherein the length of each of said link elements is variable between shorter and longer lengths, said predetermined length being generally midway between said shorter and longer lengths.

9. The apparatus of claim 8 wherein each of said link elements comprises a hydraulic cylinder, one of said link element ends being connected to said cylinder, said cylinder having first and second floating pistons therein respectively movable relatively between abutting positions and spaced positions, said cylinder having a port therein for admitting hydraulic fluid under pressure between said pistons thereby to move the same to their spaced positions, a member having first and second means thereon for respectively engaging the remote sides of said first and second pistons when the same are in said spaced positions whereby said member is mechanically locked in a neutral position upon the application of hydraulic pressure, the other of said link element ends being connected to said member, said member in said neutral position establishing said predetermined length, extension of said member with respect to said cylinder upon release of said hydraulic pressure causing said first engaging means to move said first piston toward said second piston, and retraction of said member with respect to said cylinder causing said second engaging means to move said second piston toward said first piston, abutment of said pistons at the spaced position of said second piston establishing said longer length and abutment of said pistons at the spaced position of said first piston establishing said shorter length.

10. The apparatus of claim 9 wherein said cylinder has spaced abutments respectively establishing said spaced piston positions, said member comprising an elongated rod movably extending through openings in said pistons.

11. The apparatus of claim 10 wherein said cylinder has open and closed ends, one of said abutments being adjacent said open end, said closed end being the other of said abutments, said first piston having an end which engages said closed cylinder end in said spaced position of said first piston, said first piston end having a recess formed therein, said recess having a shoulder which defines said remote side of said one piston, said opening in said one piston communicating with said shoulder, said first and second engaging means respectively comprising first and second abutment portions on opposite ends of said rod, said first abutment portion being received in said recess, said recess having a predetermined depth to accommodate movement of said first abutment portion therein upon retraction of said rod.

12. The apparatus of claim 11 wherein said first piston is elongated and has channel means formed in its outer surface communicating between said port and the space between said pistons for conducting hydraulic fluid thereto when said first piston is moved away from said closed cylinder end.

13. The apparatus of claim 11 wherein said rod has an opening therethrough communicating between its ends for admitting air to the remote end of said first piston thereby permitting its movement by said rod and first abutment portion away from said closed cylinder end.

14. The apparatus of claim 9 further comprising a pump for providing hydraulic fluid under pressure, means for selectively actuating said pump, a reservoir coupled to said pump, a hydraulic line, a valve device coupling said line to said cylinder ports, said valve device being selectively electrically actuable between first and second positions, said valve device being in said first position when de-energized and in said second position when energized, said valve device including a one-way check valve, said valve device and check valve in said first position thereof applying fluid under pressure to said cylinders while preventing reverse flow of fluid from said cylinders, said valve device in said second position permitting return flow of fluid from said cylinders to said reservoir, and means for de-energizing said valve device in response to actuation of said pump.

* * * * *